US007817829B2

(12) United States Patent
Kiefer et al.

(10) Patent No.: US 7,817,829 B2
(45) Date of Patent: Oct. 19, 2010

(54) IMAGE VISUALIZATION

(75) Inventors: Gundolf Kiefer, Aachen (DE); Helko Lehmann, Aachen (DE); Jurgen Weese, Aachen (DE); Marc Busch, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1069 days.

(21) Appl. No.: 10/598,745

(22) PCT Filed: Mar. 7, 2005

(86) PCT No.: PCT/IB2005/050836

§ 371 (c)(1),
(2), (4) Date: Sep. 11, 2006

(87) PCT Pub. No.: WO2005/091226

PCT Pub. Date: Sep. 29, 2005

(65) Prior Publication Data
US 2007/0183649 A1 Aug. 9, 2007

(30) Foreign Application Priority Data
Mar. 15, 2004 (EP) .................................. 04101048

(51) Int. Cl.
*G06K 9/00* (2006.01)
*G06T 15/00* (2006.01)
(52) U.S. Cl. ...................................... 382/128; 345/419
(58) Field of Classification Search ................. 382/128, 382/129, 130, 131, 132, 133, 134, 154; 378/62, 378/98, 901; 345/419, 424, 6; 600/407, 600/424, 425; 128/920, 925, 916
See application file for complete search history.

(56) References Cited

U.S. PATENT DOCUMENTS

| | | | | |
|---|---|---|---|---|
| 5,426,684 A * | 6/1995 | Gaborski et al. | ............... | 378/62 |
| 5,877,771 A * | 3/1999 | Drebin et al. | ................ | 345/586 |
| 6,198,847 B1 * | 3/2001 | Washizawa | .................. | 382/228 |
| 7,298,372 B2 * | 11/2007 | Pfister et al. | ................. | 345/424 |
| 7,355,597 B2 * | 4/2008 | Laidlaw et al. | ............... | 345/419 |
| 2002/0064314 A1 | 5/2002 | Comaniciu et al. | | |

FOREIGN PATENT DOCUMENTS

DE 10202986 A1 7/2003

OTHER PUBLICATIONS

Ohshima T et al "Gaze-Directed Adaptive Rendering for Interacting With Virtual Space."; Virtual Reality Annual International Symposium, 1996., Proceedings of the IEEE 1996 Santa Clara, CA, USA Mar. 30-Apr. 3, 1996, Los Alamitos, CA, USA, IEEE Comput. Soc., US Mar. 30, 1996, pp. 103-110, 267, XP010157053.

Xinyue Li et al: "Time-Critical Multiresolution Volume Rendering Using 3D Texture Mapping Hardware." Proceedings IEEE/ACM SIGGRAPH Symposium on Volume Visualization and Graphics 2002. Boston, MA, Oct. 28-29, 2002, New York, NY; IEEE, US, Oct. 28, 2002, pp. 29-36; XP010654429.

(Continued)

*Primary Examiner*—Abolfazl Tabatabai

(57) ABSTRACT

Medical imaging modalities generate increasingly more and very large three-dimensional data sets. According to an exemplary embodiment of the present invention, a three-dimensional data set of an object of interest is interactively visualized with a varying sampling rate in an image. Advantageously, a focus area may be moved by a user interactively during rendering, wherein the sampling rate of a particular part of the image is defined by its relative position to the focus area. Advantageously, this may allow for an improvement of an overall rendering performance.

20 Claims, 5 Drawing Sheets

OTHER PUBLICATIONS

Wan, M. et al: "Multi-Resolution Rendering of Large Scaled Voxel-Based Terrain." Online! Dec. 5, 2003, XP002332520.

Pomaska G.: "Implementation of Web 3D Tools for Creating Interactive Walkthrough Environments From Building Documentations." International Workshop on Vision Techniques for Digital Architecture and Archeological Archives. Published in "The Intl. Archives of Photogrammetry, Remote Sensing and Spatial Information Sciences" vol. XXXIV, Part 5/W12, Jul. 1, 2003-Jul. 3, 2003, pp. 268-272, XP002332178.

Watson, B. et al.: "Managing Level of Detail Through Peripheral Degradation: Effects on Search Performance on a Head-Mounted Display." ACM Trans. on Computer-Human Interaction, vol. 4, No. 4, 1997, pp. 323-346, XP002332176.

* cited by examiner

IMAGE VISUALIZATION

The present invention relates to the field of visualizing a three-dimensional data set in the field of digital imaging and in particular in the field of medical digital imaging. In particular, the present invention relates to a method of interactively visualizing a three-dimensional data set of an object of interest, to a data processing device, to a scanner system and to a computer program for performing an interactive visualization of a three-dimensional data set.

Most medical imaging modalities generate increasingly more and more large three-dimensional data sets, giving rise to a demand for fast and high quality rendering methods.

Volume rendering is a technique for visualizing sampled functions of three spatial dimensions by computing 2D projections of a semi-transparent volume. Volume rendering projects a volume dataset onto a two-dimensional (2D) image plane or frame buffer. Volume rendering can be used to view and analyze three-dimensional (3D) data from various disciplines, such as biomedicine, geophysics, computational fluid dynamics, finite element models and computerized chemistry. Volume rendering is also useful in the application of 3D graphics, such as virtual reality (VR), computer aided design (CAD), computer games, computer graphics, special effects and the like. The various applications, however, may use a variety of terms, such as 3D datasets, 3D images, volume images, stacks of 2D images and the like, to describe volume datasets.

Because of the increasing size of images, for example, in the medical domain, an interactive rendering speed at a high display quality continues to be a challenging task, even though computational performance of computers is increasing.

Volume rendering of medical data sets without quality reduction is a challenging task due to the increasing amount of acquired data in, for example, computed tomography (CT) and magneto resonance (MR) applications. Interactions are needed in order to let the clinician navigate through the data set in order to get the optimal field of view. Furthermore, the resulting sequence of images provides additional three-dimensional information to the observer that he cannot perceive from still images.

In order to allow for fast navigation, medical work stations typically provide a "preview" mode in which the image resolution is reduced in order to allow for interactive updates during interaction. When the user interaction stops, the image is re-rendered at full quality, which may take some time (typically in the order of seconds). In state-of-the-art work stations, the preview mode is implemented by uniformly rendering the image at a lower resolution. This method does not take into account that some portions of the image are more relevant to the observer than others. In general, the quality may be too low in order to observe a certain object of interest, since small details may appear blurred or distorted, so that the clinician has to stop with his interaction. Therefore, for example, it is not possible to observe the object of interest at motion. On the other hand, a high resolution view mode or full-scan mode of the whole image demands too much computational time for providing a fast visualization during user interaction.

It is an object of the present invention to provide for an improved visualization of a three-dimensional data set.

According to an exemplary embodiment of the present invention as set forth in claim 1, the above object may be solved by a method of interactively visualizing a three-dimensional data set of an object of interest, wherein the method allows for an interactive input and comprises the step of varying a rendering method in an image during the interactive input. The variation of the rendering method causes a non-uniform quality of the image, wherein the image is determined on the basis of the three-dimensional data set.

Advantageously, according to this exemplary embodiment of the present invention, different areas in the image may be rendered with different rendering methods, resulting in different appearances, qualities or resolutions of the different areas. Therefore, during a user interaction, regions of high interest, indicated e.g. by user interaction, may be rendered with a first rendering method, resulting in high image quality in the regions of high interest, and regions of lower interest may be rendered with a second rendering method, resulting in lower image quality in the regions of lower interest. A region of high interest may e.g. also be indicated by a stopping of the user interaction. For example, when the user scrolls through a data set, e.g. by activating the mouse wheel, and stops at a certain region, it may be assumed that the user is interested in this region and thus, that there is a region of high interest.

According to another exemplary embodiment of the present invention as set forth in claim 2, the image is rendered with the varying rendering method in a pre-scan mode, if there is an interactive input. On the other hand, if there is no interactive input, the image is re-rendered with a constant rendering method in a full-scan mode, resulting in a maximum quality or resolution of the whole image.

Advantageously, according to this exemplary embodiment of the present invention, a variation of the rendering method, such as, e.g., a variation of a sampling rate, is only performed during an interactive input, such as a user interaction. If there is no interactive input, the method switches to a full-scan mode and the image is rendered with a full rendering. This may provide for a fast visualization of an object of interest inside the three-dimensional data set.

According to another exemplary embodiment of the present invention as set forth in claim 3, the variation of the rendering method comprises a variation of a sampling rate in the image during the interactive input. The variation of the sampling rate causes a non-uniform resolution of the image.

Advantageously, according to this exemplary embodiment of the present invention, different areas in the image may be sampled at different sampling rates, resulting in different resolutions of the different areas. Therefore, during a user interaction, regions of high interest, indicated e.g. by user interaction, may be sampled at a high rate and regions of lower interest may be sampled at a lower rate. A region of high interest may e.g. also be indicated by a stopping of the user interaction. For example, when the user scrolls through a data set, e.g. by activating the mouse wheel, and stops at a certain region, it may be assumed that the user is interested in this region and thus, that there is a region of high interest.

According to another exemplary embodiment of the present invention as set forth in claim 4, the variation of the rendering method is performed on the basis of information acquired during rendering and the information comprises information concerning the interactive input.

Advantageously, this may allow for interactively changing the rendering method, such as the sampling rate, of a particular area of the image, resulting in, for example, a high resolution of that particular area. On the other hand, the resolution or the quality of the rendering method of another area may be interactively reduced, resulting in a lower resolution of that other area, which may increase the rendering speed.

According to another exemplary embodiment of the present invention as set forth in claims 5 and 6, the sampling rate comprises a first sampling rate and a second sampling rate, wherein a focus area defines a first area in the image. The first area is sampled with the first sampling rate. Furthermore, a second area in the image is sampled with the second sampling rate and a relative position of the focus area is movable with respect to the image by one of a user and an automatism based on information acquired during rendering.

Advantageously, according to this exemplary embodiment of the present invention, a user may interactively shift the focus area from one spot in the image to another spot in the image which may lead to higher quality or resolution of the other spot in the image. Advantageously, according to an aspect of this exemplary embodiment of the present invention, the shift of the focus area may be performed automatically based on information acquired during rendering, such as information about image contents or motion between subsequent frames.

According to another exemplary embodiment of the present invention as set forth in claim 7, the information comprises information selected from the group consisting of an estimation of a complexity of the data set, unavailability of hardware resources, and an update speed required from a user.

Advantageously, according to this exemplary embodiment of the present invention, an increasing complexity of the data set may lead to an increase of the quality of the rendering method (such as the sampling rate) within the focus area which may provide for a high resolution or quality within the focus area for detailed inspection. Furthermore, according to this exemplary embodiment of the present invention, an increase in update speed required from a user may lead to a reduction of the overall quality of the rendering method (e.g. the sampling rate ) in the image. This can, for example, be achieved by reducing the size of high-quality areas in the image and increasing the size of low-quality areas.

According to another exemplary embodiment of the present invention as set forth in claims 8 and 9, the rendering includes ray casting, which may involve the computation or determination of depth values and light reflection angles. According to an aspect of the present invention, the variation of the sampling rate is performed along a ray applied in the ray casting.

According to these exemplary embodiments of the present invention, a ray casting may be used to generate the image with varying resolution along a ray.

According to another exemplary embodiment of the present invention as set forth in claim 10, a data processing device is provided comprising a memory for storing a three-dimensional data set of an object of interest and a data processor for performing an interactive visualization of the three-dimensional data set, wherein the interactive visualization allows for an interactive input, and wherein the data processor is adapted for performing the following operation: loading the three-dimensional data set, and varying a rendering method in an image during the interactive input. The variation of the rendering method causes a non-uniform quality of the image and the image is determined on the basis of the three-dimensional data set.

Advantageously, this may allow for a fast visualization of an object of interest in a three-dimensional data set.

Another advantageous embodiment of the data processing device is set forth in claim 11.

The present invention also relates to scanner systems comprising a memory for storing a three-dimensional data set of an object of interest and a data processor for performing an interactive visualization of the three-dimensional data set, wherein the interactive visualization allows for an interactive input during which a rendering method in an image is varied. According to an aspect of the present invention, the scanner system is one of a CT scanner system and a MR scanner system. The scanner systems according to the present invention are set forth in claims 12 and 13.

Advantageously, this may allow for an improved rendering performance of an object of interest in a three-dimensional data set acquired by a CT scanner system or a MR scanner system.

The present invention also relates to a computer program, which may, for example, be executed on a processor, such as an image processor. Such computer programs may be part of, for example, a CT scanner system or a MR scanner system. The computer programs, according to an exemplary embodiment of the present invention, are set forth in claim 14. These computer programs may be preferably loaded into working memories of data processors. The data processors are thus equipped to carry out exemplary embodiments of the methods of the present invention. The computer programs may be stored on a computer readable medium, such as a CD-ROM. The computer programs may also be presented over a network such as the WorldWideWeb, and may be downloaded into the working memory of a data processor from such networks. The computer program according to this exemplary embodiment of the present invention may be written in any suitable programming language, such as C++.

It may be seen as the gist of an exemplary embodiment of the present invention that a three-dimensional data set of an object of interest is interactively visualized with a varying rendering method in an image during an interactive input. According to an exemplary embodiment of the present invention, a first area of the image is sampled with a high sampling rate and a second area of the image is sampled with a lower sampling rate, wherein the position of the first area may be interactively moved by a user by e.g. an appropriate user interaction or stopping of an user interaction. Advantageously, this may allow for a full resolution of an area of the image the user is particularly interested in, whereas areas of the image the user is not particularly interested in may be rendered at a low rate, resulting in a low resolution. This may lead to a reduction of computational cost while still providing for sufficient image quality of a part of the image which is of interest for the user.

These and other aspects of the present invention will become apparent from and elucidated with reference to the embodiments described hereinafter.

Exemplary embodiments of the present invention will be described in the following, with reference to the following drawings.

Figure 1:
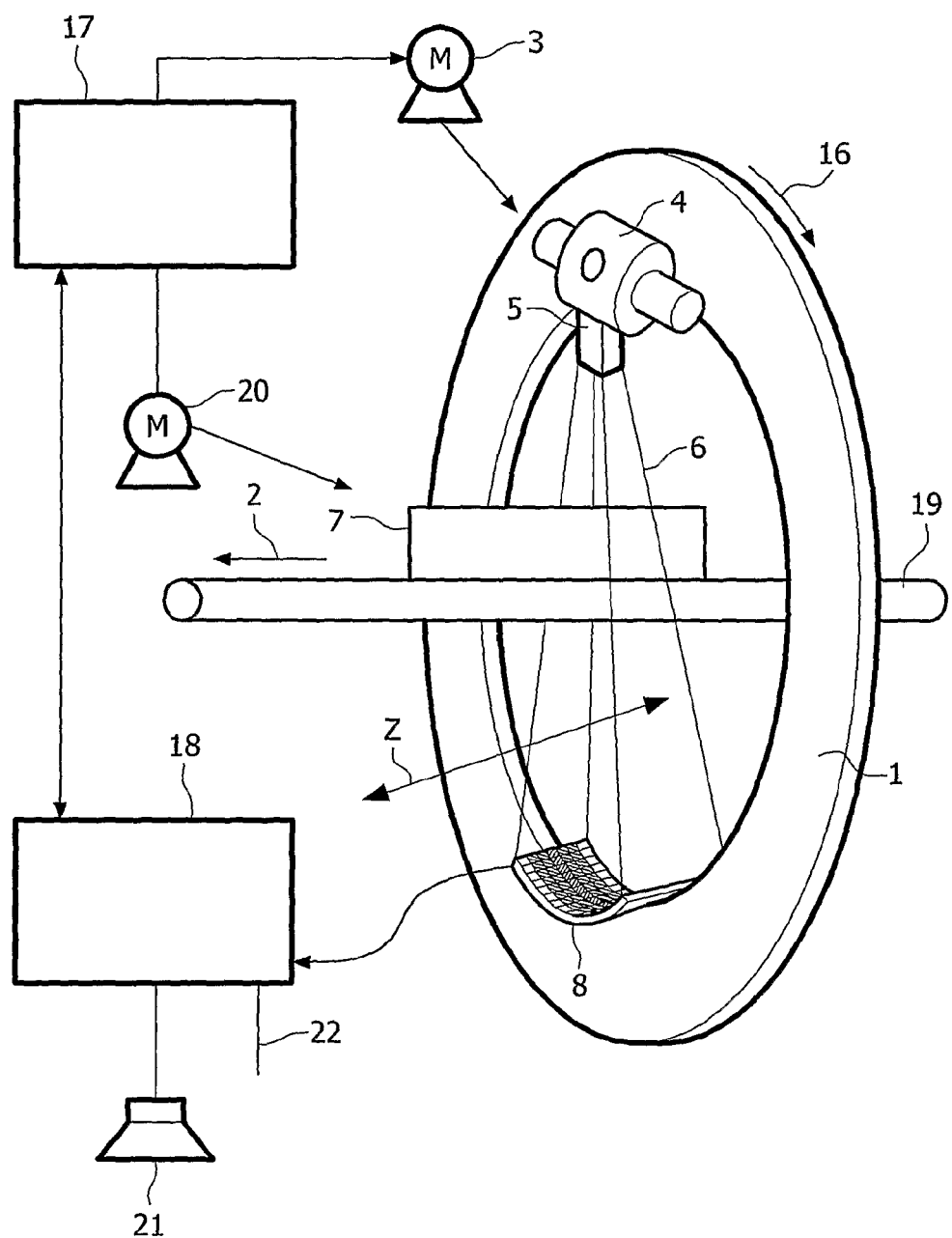
FIG. 1 shows a simplified schematic representation of an embodiment of a computed tomography (CT) scanner according to the present invention.

FIG. 1 shows an exemplary embodiment of the present invention of a CT (computed tomography) scanner system according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications, such as material testing.

The scanner depicted in FIG. 1 is a cone-beam CT scanner. The CT scanner depicted in FIG. 1 comprises a gantry 1, which is rotatable around a rotational axis 2. The gantry is driven by means of a motor 3. Reference numeral 4 designates a source of radiation such as an x-ray source, which, according to an aspect of the present invention, emits a polychromatic radiation beam.

Reference numeral 5 designates an aperture system which forms a radiation beam emitted from the radiation source to a cone-shaped radiation beam 6.

The cone-beam 6 is directed such that it penetrates an object of interest 7 arranged in the centre of the gantry 1, i.e. in an examination region of the CT scanner, and impinges onto the detector 8. As may be taken from FIG. 1, the detector 8 is arranged on the gantry 1 opposite the source of radiation 4, such that the surface of the detector 8 is covered by the cone-beam 6. The detector 8 depicted in FIG. 1 comprises a plurality of detector elements.

During a scan of the object of interest 7, the source of radiation 4, the aperture system 5 and detector 8 are rotated along the gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

In FIG. 1, the object of interest is disposed on a conveyor belt 17. During the scan of the object of interest 7, while the gantry 1 rotates around the patient 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans. Instead of providing a conveyor belt 19, for example, in medical applications, where the object of interest 7 is a patient, a movable table is used. However, it should be noted that in all of the described cases it is also possible to perform a circular scan, where there is no displacement in a direction parallel to the rotational axis 2, but only the rotation of the gantry 1 around the rotational axis 2.

The detector 8 is connected to the calculation unit 18. The calculation unit 18 receives the detection result, i.e. the read-outs from the detector element of the detector 8, and determines a scanning result on the basis of the read-outs. The detector elements of the detector 8 may be adapted to measure the attenuation caused to the cone-beam 6 by the object of interest. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit which may be realized by a data processor integrated into a data processing device comprising a memory for storing a three-dimensional data set of an object of interest may also be adapted to perform an interactive visualization of the three-dimensional data set, wherein the interactive visualization allows for an interactive input, for example by a user. The data processor according to an aspect of the present invention may be adapted for loading the three-dimensional data set and for varying a sampling rate in a projection image during the interactive input. The variation of the sampling rate causes a non-uniform resolution of the projection image, meaning that a region or regions of high resolution of the projection image are generated and that a region or regions of low resolution are generated. It should be understood that the projection image is acquired on the basis of the three-dimensional data set.

Furthermore, the data processor may be adapted for performing an interactive visualization of the three-dimensional data set, wherein, if there is an interactive input, the three-dimensional data set is rendered at the varying sampling rate in a pre-scan mode and wherein, if there is no interactive input, the three-dimensional data set is re-rendered at a full sampling rate in a full-scan mode, resulting in a maximum resolution of the whole projection image. The variation of the sampling rate is hereby performed on the basis of information acquired during rendering, wherein the information comprises information about the interactive input.

Furthermore, as may be taken from FIG. 1, the calculation unit 18 may be connected to a loudspeaker 21 to, for example, automatically output an alarm.

Figure 2:
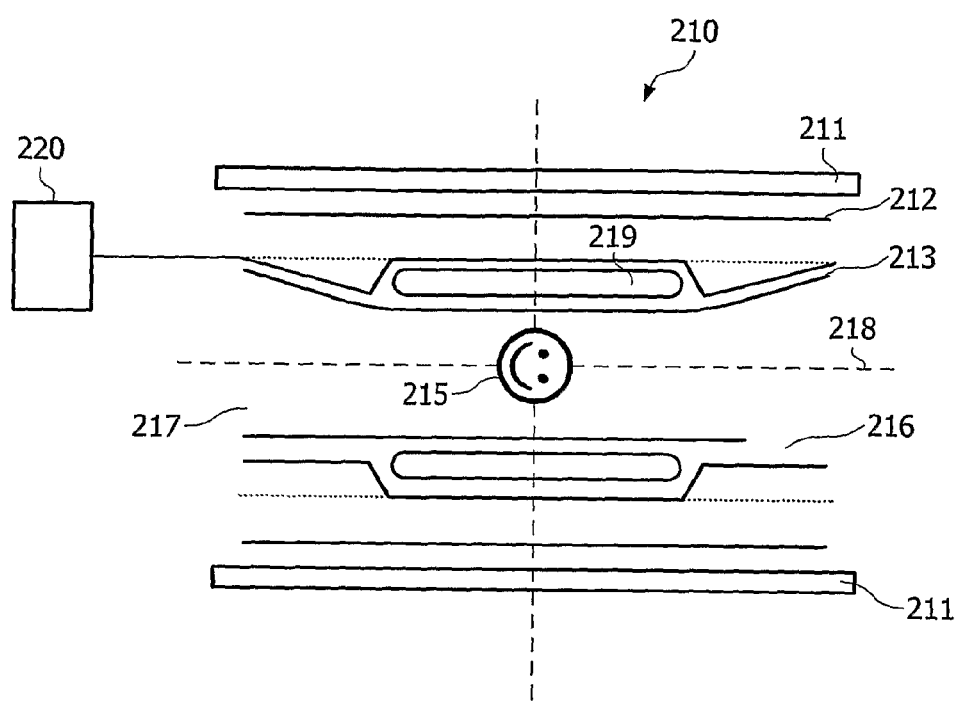
FIG. 2 shows a simplified schematic representation of an embodiment of a magneto-resonance (MR) scanner according to the present invention.

FIG. 2 shows a simplified schematic representation of an embodiment of a MR scanner system according to the present invention. The MR scanner system comprises coils 210 which are arranged along an axis 218 and surround an examination space 217, in which a patient 215 which has to be examined is positioned. Advantageously, the patient lies on a movable table or conveyor belt 216, which is disposed at the lower part of the examination space 217. The system of coils 210 surrounding the examination space 217 comprises an HF-coil 219, an actively shielded arrangement of gradient coils comprising an inner coil 213 and an actively shielded coil or shield 212 and a cryostat 211, in which the coils are arranged in order to be cooled down during generation of the magnetic field. The arrangement of gradient coils 213, 212 may be connected to a gradient amplifier 220.

Furthermore, the MR scanner system may comprise, according to the CT scanner system depicted in FIG. 1, a motor control unit with respective motors, for example for moving the conveyor belt 216, and a calculation unit (not shown in FIG. 2). Such a MR scanner system is described in DE 102 02 986 A1, which is hereby incorporated by reference.

Figure 3:
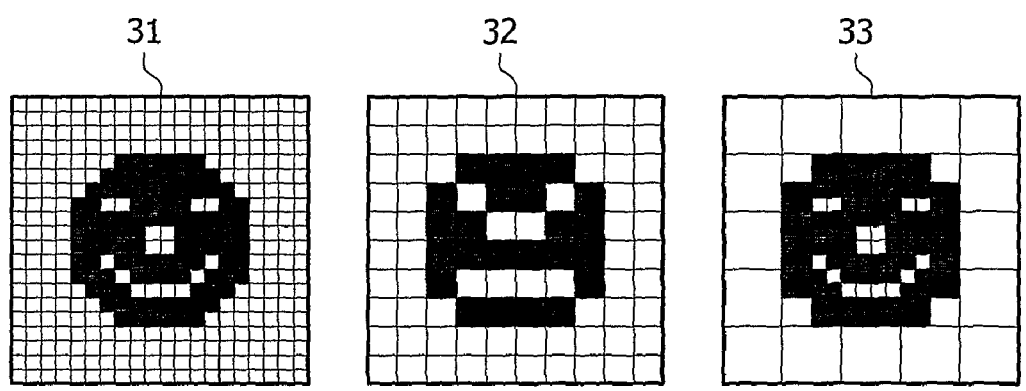
FIG. 3 shows a full-quality image rendered at a maximum rate (left), an image rendered at a uniform sub-sampling rate (middle) and a focused preview of an image rendered at varying rates according to an exemplary embodiment of the present invention (right).

FIG. 3 shows an example of a full-quality image of 400 pixels 31 and a uniformly sub-sampled image 32 resulting from the same data set but sampled with a lower sampling rate than the image 31. This uniform rendering of the image 32 at a lower resolution in a preview mode is a technique applied in work stations in order to provide a fast image visualization. Unfortunately, this method does not take into account that some portions of the image are more relevant to the observer than others. As may be seen from image 32, the quality in the centre of the image is too low to observe that the schematic phase depicted in the image is smiling. Therefore, in order to get a more detailed view of the image centre, the user has, for example, to stop his interaction and switch to the full-quality image mode as depicted in image 31.

Image 33 shows a non-uniformly sub-sampled image of 104 pixels (the image 32 comprises 100 pixels). The centre of the image 33 is rendered at full resolution and the resolution decreases towards the image borders. The focus area, according to an exemplary embodiment of the present invention, may either be fixed in the image centre or variable, for example movable by the user. In both cases, the user has the possibility to move his object of interest into the focus area in a very intuitive way and then to observe it interactively at full quality.

Therefore, the invention combines interactive speed (guaranteed response time) with optimal image quality by reducing the sampling rate and therefore the image quality in regions which are of low interest for the user. At the same computational complexity, the perceived image quality is better than with conventional undersampling, which is depicted in image 32.

In a simple and intuitive way, the user can, according to an exemplary embodiment of the present invention, move the "interesting" region into the focus area or vice versa. Thus, a full-quality visualization at an interactive frame rate may be achieved, which is not possible by conventional sub-sampling.

In the following, an exemplary implementation of the present invention is described. The output image of x times y pixels is divided into three areas: an inner area or first area, a peripheral area or second area and an outer area or third area.

The inner area covers the central rectangle of approximately $\frac{1}{3}x \cdot \frac{1}{3}y$ pixels and will be rendered at full resolution.

The peripheral area or second area covers the central rectangle of approximately $\frac{2}{3}x \cdot \frac{2}{3}y$ pixels excluding the inner area. It will be rendered at half resolution in both directions resulting in one sample per four pixels.

The outer area covers the rest of the image and will be rendered at a quarter of the resolution resulting in $\frac{1}{16}$ of the samples per area unit compared to full-quality rendering.

It should be noted that, although this exemplary embodiment of the present invention makes use of three areas which are rendered at three different sampling rates, the above method may also be used for two different areas rendered at two sampling rates, or for any other number of different image areas which will be rendered at different sampling rates.

In the above described case of three different sampling rates, the total number of pixel values to be calculated exactly is approximately $$\tfrac{1}{3}x\cdot\tfrac{1}{3}y+\tfrac{1}{4}(\tfrac{2}{3}x\cdot\tfrac{2}{3}y-\tfrac{1}{3}x\cdot\tfrac{1}{3}y)+\tfrac{1}{16}(xy-\tfrac{2}{3}x\cdot\tfrac{2}{3}y)=\tfrac{11}{48}xy,$$

which is slightly less than $\frac{1}{4}xy$ for uniform half-resolution sampling, so that the computational complexity for creating such a preview is also similar. However, the central part is rendered at full quality, and by the usual navigation tools the user may move the most interesting part into the viewport centre. This way, the user may then observe that part animated at full resolution while still having an impression of the surrounding areas, which are rendered at reduced quality.

The sizes and sub-sampling rates of the inner, peripheral and outer areas as described above as well as the total number of different zones or areas may be varied.

The variation of these parameters may be performed dynamically based on
a) the complexity of the data set,
b) unavailability of hardware resources, and
c) the type of interaction. For example, during fast interactions, the "high quality" area may be reduced to achieve faster image updates, while during slow interactions the size of the "high quality" area or areas is increased to improve the general image quality.

Furthermore, the focus area may not be fixed in the centre of the image, but be placed
a) by the user, or
b) automatically based on the image contents, such that, for example, the focus area is moved to small structures which need a high resolution, or c) automatically based on motion between subsequent frames (full resolution where little motion, low resolution where much motion).

Furthermore, the focus criteria may not just determine the sample rate in the image domain, but any other parameter of the rendering algorithm that allows a speed-quality trade-off. One example is to vary the sampling rate along a ray if ray casting is used.

Furthermore, it should be understood that, according to an aspect of the present invention, it may not be the sampling rate which is varied, but, for example, an arithmetic accuracy used for the rendering. For example, if for the calculation of image colour values single-precision floating point numbers (e.g. by using the 32-bit format according to the IEEE standard) are used instead of double-precision representations (e.g. according to the IEEE 64-bit format), the computational cost may be reduced at the expense of a lower accuracy. As another example, some rendering methods require the calculation of complex arithmetical functions such as $e^x$, $\ln(x)$, or $\operatorname{sqrt}(x)$. Such functions can be replaced by simple linear or polynomial approximations, again at the expense of arithmetical accuracy. In any case, the overall effect will be a variation of image quality or resolution along the image, and therefore a reduction of computational cost compared to high accuracy rendering along the entire image.

Furthermore, the focus criteria may be combined with an adaptive sampling technique which, for example, involves the computation or determination of depth values and light reflection angles and a variation of the sampling frequency in the projection image on the basis of at least one of a depth value, surface normal, viewing direction, and light vector. Therefore, by combining an exemplary method according to the present invention with an adaptive sampling technique are fast rendering with high resolution in the focus area may be achieved.

Figure 4:
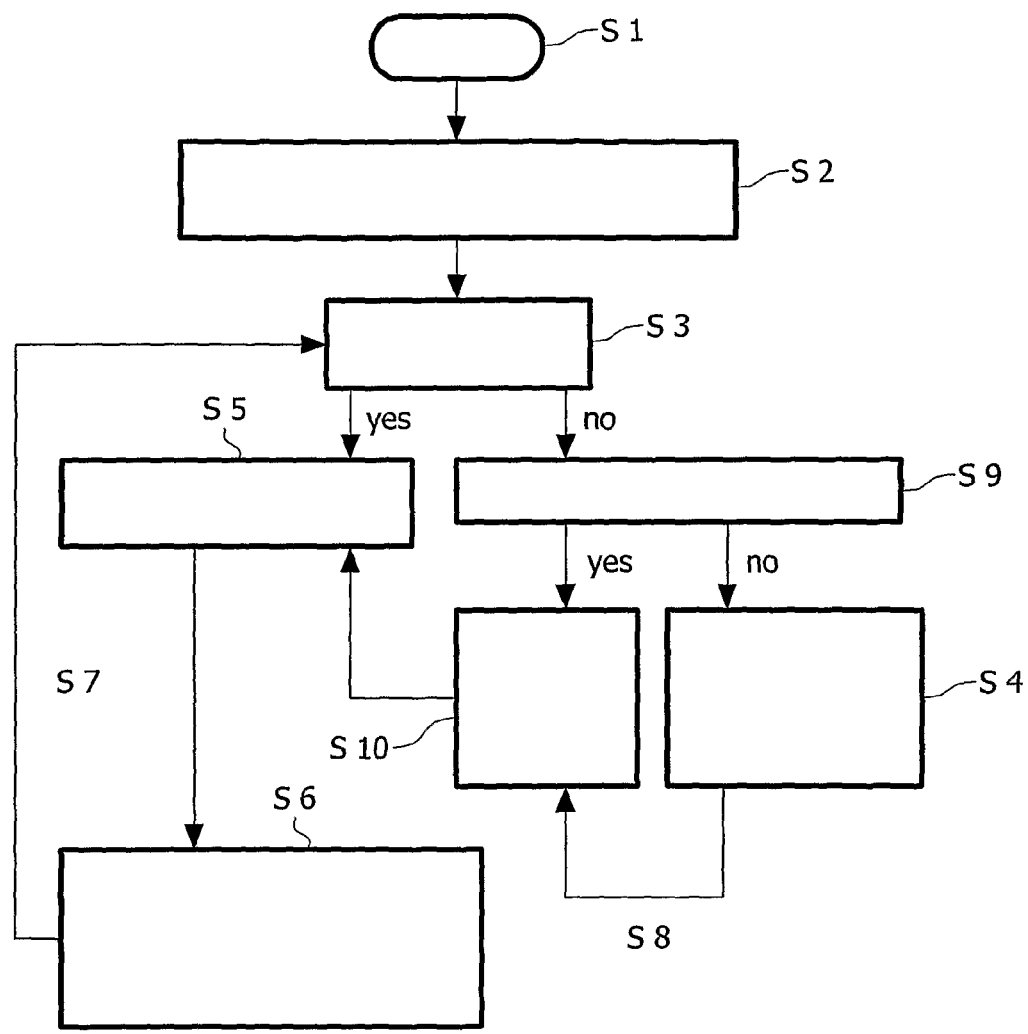
FIG. 4 shows a flow-chart of an exemplary embodiment of a method of interactively visualizing a three-dimensional data set of an object of interest according to the present invention.

FIG. 4 shows a flow-chart of an exemplary embodiment of a method of interactively visualizing a three-dimensional data set of an object of interest according to the present invention. The method starts at step S1, after which a three-dimensional data set of an object of interest is acquired in step S2, for example by means of a polychromatic source of electromagnetic radiation generating a polychromatic beam and by means of a radiation detector detecting the polychromatic beam. Then, in step S3 it is determined whether there is an interactive input or whether there is no interactive input. In case, there is an interactive input, rendering information is acquired in step S5. This rendering information may comprise information about the interactive input, such as movement of the focus area, or an update speed required by the user. Furthermore, the rendering information may comprise information about an availability of hardware resources or a complexity of the data set. After acquisition of the rendering information, the projection image is rendered at a varying sampling rate on the basis of the acquired rendering information in step S6, such that, for example, the image is rendered at full resolution in an inner area defined by the focal area adjusted by the user, whereas the image is rendered at a lower resolution in areas outside the inner area.

After that, in step S7 the method jumps back to step S3 where it is determined whether there is an interactive input or no. In case it is determined in step S3, that there is no interactive input, the method jumps to step S9, in which it is determined, whether a re-rendering has already been performed. In case a re-rendering has already been performed, the method waits for a further interactive input in step S10 after which it jumps to step S5 for the acquisition of rendering information. In case it is determined in step S9, that no re-rendering has already been performed, the projection image is re-rendered at a full sampling rate in step S4 after which it jumps to step S10 in order to wait for another interactive input.

Thus, during an interactive input, rendering information is acquired and a rendering of the projection at a varying sampling rate on the basis of the rendering information is performed continuously, e.g. in form of a closed loop. If there is no interactive input any more, the closed loop is left and the projection image is re-rendered at full image quality, if no re-rendering of the image has already been performed. If, however, it is determined in step S9, that a re-rendering of the image has already been performed, the method waits for another interactive input in step S10, after which it jumps directly to step S5 for the acquisition of rendering information.

Figure 5:
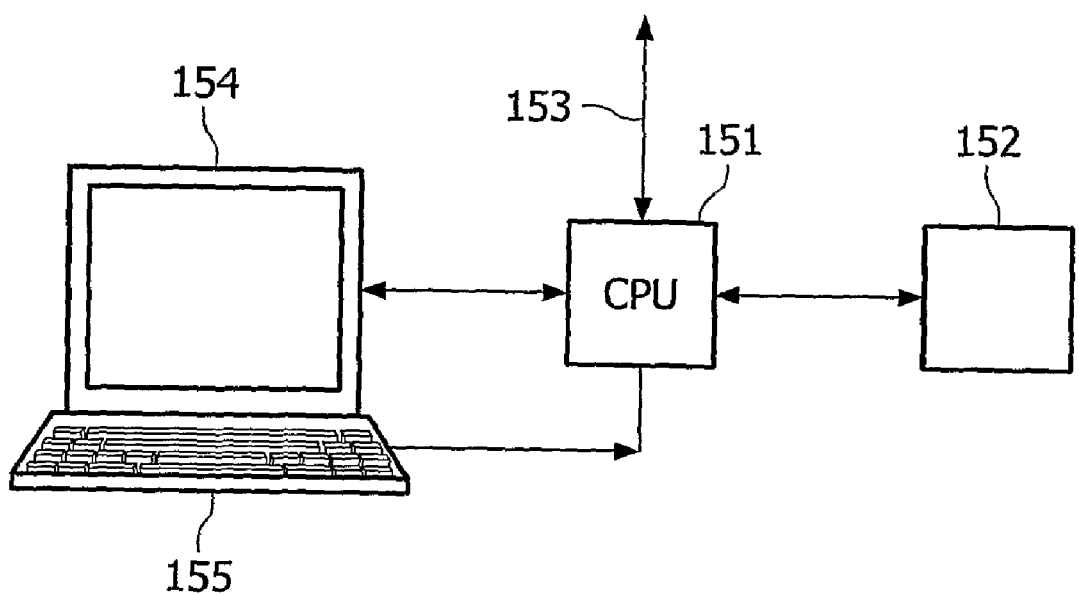
FIG. 5 shows an exemplary embodiment of the present invention of an image processing device according to the present invention, for executing an exemplary embodiment of a method in accordance with the present invention.

FIG. 5 depicts an exemplary embodiment of an image processing device according to the present invention, for executing an exemplary embodiment of a method in accordance with the present invention. The image processing device depicted in FIG. 5 comprises a central processing unit (CPU) or image processor 151 connected to a memory 152 for storing an image depicting an object of interest, such as a patient. The image processor 151 may be connected to a plurality of input/output network or diagnosis devices, such as a MR device or a CT device. The image processor is furthermore connected to a display device 154, for example a computer monitor, for displaying information or an image computed or adapted in the image processor 151. An operator may interact with the image processor 151 via a keyboard 155 and/or other output devices, which are not depicted in FIG. 5.

Furthermore, via the bus system 153 it is also possible to connect the image processing and control processor 151 to, for example, a motion monitor which monitors a motion of the object of interest. In case, for example, a lung of a patient is imaged, the motion sensor may be an exhalation sensor. In case the heart is imaged, the motion sensor may be an electrocardiogram (ECG).

It should be noted that, although the embodiments of the invention described with respect to the drawings vary the sampling rate in order to provide for an improved quality of regions of high interest, the method is not limited to variation of the sampling rate but may also, e.g., vary a rendering method, such as, e.g., varying an arithmetic accuracy used for the rendering, for example by replacing complex arithmetical functions such as $e^x$, $\ln(x)$, or $\text{sqrt}(x)$ by simple linear or polynomial approximations.

The invention claimed is:

1. A method of interactively visualizing a three-dimensional data set of an object of interest, wherein the method allows for an interactive input, the method comprising the step of:
    varying with a processor a rendering method in an image during the interactive input;
    wherein the variation of the rendering method causes a non-uniform quality of the image; and wherein the image is generated with the processor on the basis of the three-dimensional data set;
    wherein, if there is an interactive input, the image is rendered with a varying rendering method in a pre-scan mode, and
    wherein, if there is no interactive input, the image is re-rendered with a constant rendering method in a full-scan mode resulting in a maximum quality of the whole image.

2. The method according to claim 1, wherein the image is rendered in the pre-scan mode of a quality less than the quality of the whole image in the full-scan mode; and wherein, if there is no interactive input, the image is re-rendered in the full-scan mode of a quality higher than the quality of the whole image in the pre-scan mode.

3. The method according to claim 2, wherein the variation of the rendering method comprises a variation of a sampling rate in the image during the interactive input; and wherein the variation of the sampling rate causes a non-uniform resolution of the image.

4. The method according to claim 3, wherein the sampling rate comprises a first sampling rate and a second sampling rate; wherein a focus area defines a first area in the image; wherein the first area is sampled with the first sampling rate; and
    wherein a second area in the image is sampled with the second sampling rate.

5. The method according to claim 4, wherein a relative position of the focus area is movable with respect to the image by one of a user and an automatism based on information acquired during rendering.

6. The method according to claim 1, wherein the variation of the rendering method is performed on the basis of information acquired during rendering; and wherein the information comprises information concerning the interactive input.

7. The method according to claim 6, wherein the information comprises information selected from the group consisting of an estimation of a complexity of the data set, an availability of hardware resources, and an update speed required from a user.

8. The method according to claim 1, wherein the rendering includes a ray casting.

9. The method according to claim 8, wherein the variation of the sampling rate is performed along a ray applied in the ray casting.

10. The method according to claim 1, wherein the image is generated from a single three-dimensional data set.

11. The method according to claim 10, wherein the single three-dimensional data set includes data from a single imaging modality.

12. A data processing device, comprising:
    a memory for storing a three-dimensional data set of an object of interest;
    a data processor for performing an interactive visualization of the three-dimensional data set, wherein the interactive visualization allows for an interactive input, wherein the data processor is adapted for performing the following operation:
    loading the three-dimensional data set;
    varying a rendering method in an image during the interactive input;
    wherein the variation of the rendering method causes a non-uniform resolution of the image;
    wherein the image is generated on the basis of the three-dimensional data set; and
    wherein, if there is an interactive input, the rendering method is a pre-scan mode having a resolution less than a resolution of a full-scan mode; and
    wherein, if there is no interactive input, the rendering method is in the full-scan mode.

13. The data processing device according to claim 12, wherein the pre-scan mode resolution less is less than a maximum resolution; and the full-scan mode resolution is the maximum resolution.

14. The device according to claim 13, wherein the information comprises information selected from the group consisting of an estimation of a complexity of the data set, an availability of hardware resources, and an update speed required from a user.

15. The device of claim 12, wherein the variation of the rendering method comprises a variation of a sampling rate in the image during the interactive input; and wherein the variation of the sampling rate causes a non-uniform resolution of the image.

16. The device according to claim 15, wherein the sampling rate comprises a first sampling rate and a second sampling rate; wherein a focus area defines a first area in the image; wherein the first area is sampled with the first sampling rate; and wherein a second area in the image is sampled with the second sampling rate.

17. The device according to claim 16, wherein a relative position of the focus area is movable with respect to the image by one of a user and an automatism based on information acquired during rendering.

18. A scanner system, comprising:

a memory for storing a three-dimensional data set of an object of interest;

a data processor for performing an interactive visualization of the three-dimensional data set, wherein the interactive visualization allows for an interactive input, wherein the data processor is adapted for performing the following operation:

loading the three-dimensional data set;

varying a rendering method in an image during the interactive input;

wherein the variation of the rendering method causes a non-uniform quality of the image; and wherein the image is generated on the basis of the three-dimensional data set;

wherein, if there is an interactive input, the image is rendered with a varying rendering method in a pre-scan mode of a quality less than a maximum quality of the whole image, and wherein, if there is no interactive input, the image is re-rendered with a constant rendering method in a full-scan mode resulting in the maximum quality of the whole image.

19. A scanner system according to claim 18, wherein the scanner system is one of a CT scanner system and a MR scanner system.

20. A computer-readable medium containing instructions for performing an interactive visualization of a three-dimensional data set of an object of interest, wherein the interactive visualization allows for an interactive input, wherein the instructions cause a data processor to perform the following operation when the instructions are executed on the data processor:

loading the three-dimensional data set;

varying a rendering method in an image during the interactive input;

wherein the variation of the rendering method causes a non-uniform quality of the image;

wherein the image is generated on the basis of the three-dimensional data set;

wherein, if there is an interactive input, the image is rendered with a varying rendering method in a pre-scan mode of a quality less than the maximum quality of the whole image, and wherein, if there is no interactive input, the image is re-rendered with a constant rendering method in a full-scan mode resulting in the maximum quality of the whole image.

\* \* \* \* \*